Sept. 29, 1970  E. F. ROSSI  3,530,973
FEED CONVEYING AND DISTRIBUTING APPARATUS
Filed Dec. 30, 1968  2 Sheets-Sheet 1

Inventor
Eugene F. Rossi
By Arthur M. Streich
Attorney

Sept. 29, 1970     E. F. ROSSI     3,530,973

FEED CONVEYING AND DISTRIBUTING APPARATUS

Filed Dec. 30, 1968     2 Sheets-Sheet 2

Inventor
Eugene F. Rossi
By Arthur M. Streich
Attorneys

United States Patent Office 3,530,973
Patented Sept. 29, 1970

3,530,973
FEED CONVEYING AND DISTRIBUTING APPARATUS
Eugene F. Rossi, Wauwautosa, Wis., assignor to Allis-Chalmers Manufacturing Company, Milwaukee, Wis.
Filed Dec. 30, 1968, Ser. No. 787,850
Int. Cl. B65g *16/22*
U.S. Cl. 198—96                                   10 Claims

ABSTRACT OF THE DISCLOSURE

An apparatus is disclosed for receiving a stream of particles or agglomerates of finely divided material from a particle size screening device, compacting mill, balling drum or balling pan, conveying the material, and distributing it across the entire width of a transport conveyor substantially wider than the stream of material, for delivery to a traveling grate preheater of furnace of a width approximately the same as the transport conveyor. The stream of material is dropped over a central portion of the transport conveyor and intercepted by shuttle conveyor that spreads the stream of material across the entire width of the transport conveyor. The shuttle conveyor is transverse to the transport conveyor and of adjustable length preferably set to be an effective length of approximately one-half the width of the transport conveyor. The shuttle conveyor reciprocates with strokes back and forth over the transport conveyor alternately discharging material first over one end thereof and then over the other end thereof but always over the end which is the leading end for the stroke then in progress. A stream of material is therefore distributed across the entire width of the transport conveyor which is wider than the stream, by the shuttle conveyor of a length only about one-half the width of the transport conveyor.

BACKGROUND OF THE INVENTION

Field of the invention

This invention relates in general to conveying a stream of material from such as particle sizing screens or agglomerating devices, and distributing such material across the entire width of a conveyor substantially wider than the stream. In particular, this invention relates to spreading material on a conveyor feeding a traveling grate furnace or traveling grate portion of a furnace of such types as are disclosed in U.S. Pats. 2,750,272 of 1956; 2,925,336 of 1960; 3,235,372 of 1966 and 3,396,952 of 1968.

DESCRIPTION OF THE PRIOR ART

U.S. Pat. 1,521,820 of 1925 discloses an apparatus including a shuttle conveyor for spreading a relatively narrow stream of material across a charge car having a width substantially greater than the stream of material. The mechanism shown in this patent requires a shuttle conveyor having a length of a dimension at least as great as the width of the charge car. Another type, such as shown in U.S. Pat. 3,067,857, discloses a material spreading conveyor arranged over and generally parallel to a wider transport conveyor and the spreading conveyor oscillates to drop and spread material on the wider transport conveyor. Neither of these prior art types have achieved any significant degree of acceptance or popularity for use with mineral furnacing systems requiring a uniform material distribution, such as are shown in the U.S. patents identified in the preceeding section headed "Field of the Invention." The presently most popular prior art particle spreading devices for such furnacing systems are those disclosed in U.S. Pats. 2,998,781 of 1961 and 3,184,037 of 1965. The present invention, as will appear from the objects, description and claims to follow, is presented as an advance in the state of the prior art as illustrated by the foresaid prior art patents.

SUMMARY OF THE PRESENT INVENTION

It is an object of the present invention to provide a new and improved apparatus for conveying a stream of material and spreading the material across the width of a conveyor substantially wider than the stream, utilizing a shuttle conveyor of novel construction that need not have an effective operating length more than about one-half the width of the conveyor being fed material by the shuttle conveyor.

It is another object of this invention to provide a new and improved shuttle conveyor operative to spread a stream of material across a span having a dimension up to twice the length of the shuttle conveyor.

It is also an object of this invention to provide a new and improved apparatus for spreading a stream of material across the width of a conveyor substantially wider than the stream, which utilizes reciprocating movement of a shuttle conveyor to rotate belt supporting rolls and move a belt carried by the shuttle conveyor.

It is a still further object of the present invention to provide a new and improved reciprocating shuttle conveyor and apparatus including the shuttle conveyor for spreading material, which provides for adjusting the span over which material is distributed.

According to a preferred embodiment of the present invention a stream of material is dropped over a central portion of a transport conveyor but intercepted by a shuttle conveyor transverse to the transport conveyor and of an effective operating length about one-half the width of the transport conveyor. The shuttle conveyor has a frame carrying a pair of parallel spaced apart rotatable rolls lapped by an endless loop of conveyor belt providing an upper belt strand and a lower belt strand between the rolls. A motor providing reciprocating strokes is connected to the frame to alternately push and pull the frame in opposite directions along a horizontal path normal to the rolls. A pinion gear is connected to the end of one of the rolls and the pinion gear engages a rack gear mounted on support structure in a fixed position in space. By each push and pull stroke applied to the frame, the pinion gear is rolled along the stationary rack gear. The rolling pinion gear turns the roll to which it is attached and moves the upper strand of the belt in the same direction as the frame is carrying the pinion gear along the rack gear. The direction the belt moves therefore reverses when the movement of the shuttle frame reverses. Material on the upper strand of the belt is dumped over the one roll of the pair which is the lead roll during the push stroke and over the other roll which is the lead roll during the pull stroke. Material is dumped, alternately, over both rolls of the shuttle conveyor and always over the leading roll. By permitting the push and pull strokes to proceed for a distance equal to the distance spanned by the shuttle conveyor rolls, the shuttle conveyor will spread material across a span beneath the rolls which is twice the distance spanned by the rolls.

Other objects of the invention and how they are attained will appear fro mthe following description of the invention with reference to the drawings.

BRIEF DESCRIPTION OF THE DRAWINGS

Referring to FIG. 1, as there shown a conveyor 1 which may be such as a discharge conveyor from a particle size screening device (not shown), deposits material on a delivery conveyor 2 which comprises a belt 3 looped over rolls, 4, 5 and is driven by means (not shown) to carry material toward a shuttle conveyor 6. The discharge end roll 5 of conveyor 2 is located over a central portion of a transport conveyor 7 intermediate edges 8 and 9 thereof. Each of these conveyors move in a direction or directions indicated by arrows and FIGS. 2 through 5 show sequential positions which will hereinafter be described in detail with regard to the operation of equipment shown in greater detail in FIGS. 7 and 8.

Figure 7:
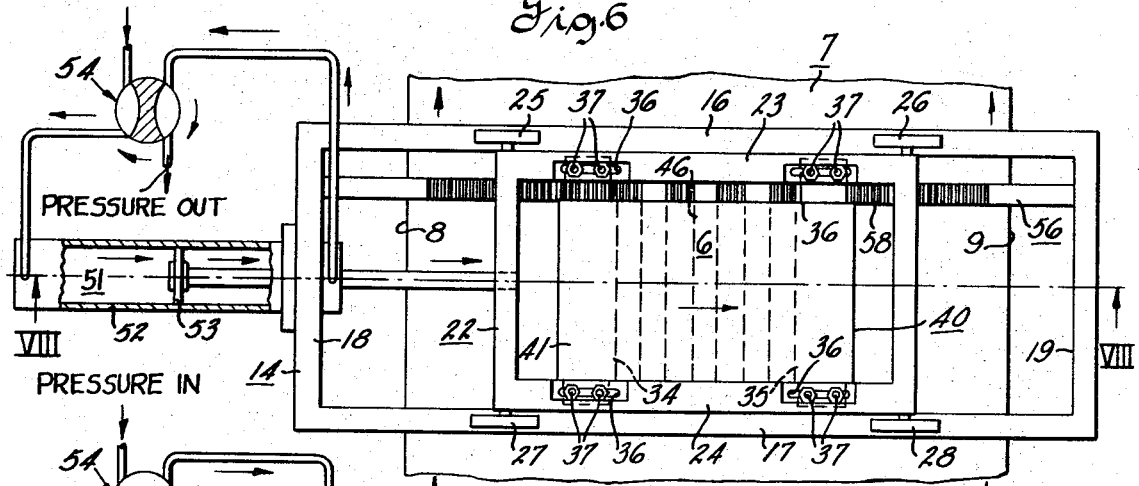
FIG. 7 is a plan view, in part diagrammatic, showing more details of shuttle conveyor construction.
Figure 8:
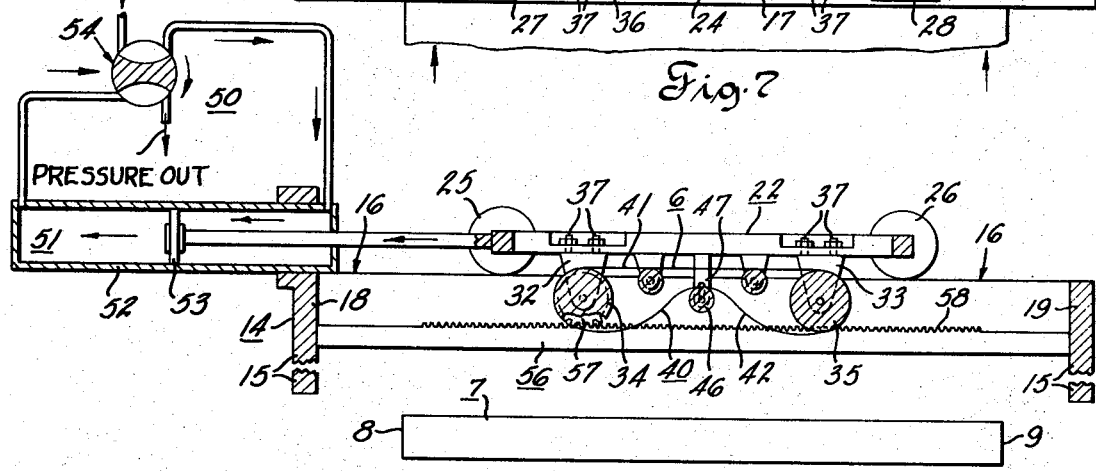
FIG. 8 is a view in elevation, in part diagrammatic, taken along line VIII—VIII in FIG. 7 as viewed in the direction indicated by arrows.

Referring then to FIGS. 7 and 8, a track assembly 14 is shown mounted over the transport conveyor 7 on support means 15. The track assembly 14 includes rails 16, 17 parallelly spaced apart by cross members 18, 19.

The shuttle conveyor 6 is mounted on track assembly 14. The shuttle conveyor 6 comprises a rectangular frame 22 carried by wheels 25, 26, 27 and 28. The frame 22 has side members 23, 24 parallel to rails 16, 17. Wheels 25 and 26 mounted on side member 23 ride on rail 16 and wheels 27, 28 mounted on side member 24 ride on rail 17. The frame 22 also includes a first pair of brackets 32 and second pair of brackets 33 with a first roll 34 journaled in brackets 32 and a second roll 35 journaled in brackets 33, to support rolls 34, 35 normal to rails 16, 17 and parallel to the edges 8 and 9 of the transport conveyor 7. The side members 23, 24 are provided with slots 36 parallel to rails 16, 17 and the brackets 32, 33 are slidably connected to side members 23, 24 by bolts 37 that project through the slots 36 to thereby provide for moving rolls 34, 35 toward and away from each other to adjust the distance therebetween. The rolls 34, 35 are lapped by an endless loop of conveyor belt 40 with portions of bolt 40 defining an upper strand 41 and a lower strand 42 between the rolls 34, 35. A slack take-up roll 46 is adjustably supported and secured below strand 42, by a pair of slotted brackets 47 that provide for raising and lowering slack take-up roll 46 to establish and maintain selected tension on belt 40. The roll 46 may be secured in slotted brackets and in any vertical position relative thereto by suitable means (not shown).

A first reversible drive means, which is a reversible shuttle conveyor drive 50, comprises a fluid pressure operated servomotor 51 having a cylinder 52 anchored to crossmember 18 of the track assembly 15, and a piston 53 connected to frame 22 of shuttle conveyor 6. Fluid pressure control means 52 are shown diagrammatically, for delivering and venting, alternately, fluid pressure to cylinders 52 on both sides of piston 53, as indicated by arrows in FIG. 7 and FIG. 8.

A second reversible drive means, which is a reversible belt drive means 56, comprises a pinion gear 57 concentrically mounted on one end of the shuttle conveyor roll 34, and a rack gear 58 extending from crossmembers 18 to crossmember 19 of track assembly 14 and between rails 16, 17. The rack gear thus occupies a position fixed in space. The pinion gear 57 engages the rack gear 58 and by the alternating strokes of the frame 22 the pinion gear 57 is rolled along the stationary rack gear 58 to turn roll 34 in a direction that moves the upper strand 41 of belt 40 always in the same directioon as the movement of frame 22 relative rails 16, 17.

In the operation of the apparatus that has been described, fluid pressure delivered as shown in FIG. 7, to the left side of piston 53 in cylinder 52 and drained from the right side of piston 53, results in piston 53 moving frame 22 to the right as indicated by the arrows in FIG. 7. As wheels 25–28 are rolled along rails 16, 17 to the right, the pinion gear 57 is rolled along rack gear 58 to the right and the pinion gear 57 is thereby turned and turns roll 34 to move the top strand 41 of belt 40 to the right. That is, strand 41 of belt 40 moves in the same direction relative to frame 22 as frame 22 is moving relative to rails 16, 17. When the fluid pressure control means 54 is turned from the position shown in FIG. 7 to the position shown in FIG. 8 the flow of fluid pressure to and from cylinder 52 is reversed and pressure flows into cylinder 52 to act upon piston 53 to move it to the left while fluid is drained from the left side of piston 53. Thus as shown in FIG. 8 piston 53 is pulling frame 22 to the left and as wheels 25–28 are rolled along rails 16, 17 to the left, pinion gear 57 is also rolled along such gear 58 to the left. Thus pinion gear 57 again turns roll 34 to move the upper strand 41 of belt 40 but now to the left, or in other words strand 41 of belt 40 again moves in the same direction relative to frame 22 as frame 22 is moving on rails 16, 17.

Figure 1:
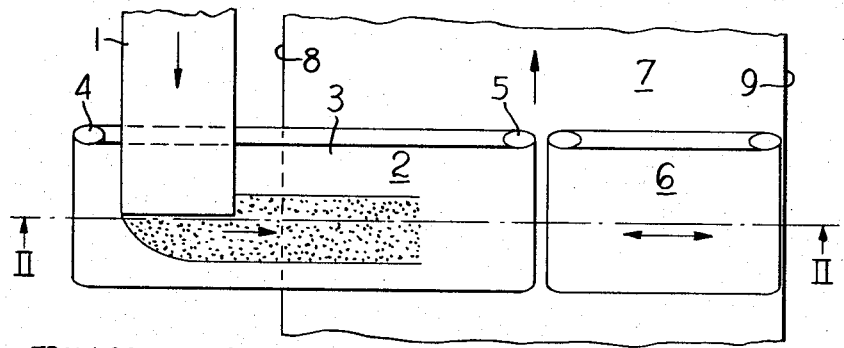
FIG. 1 is a diagrammatic plan view of a discharge conveyor from such as a screening device, a delivery conveyor, a shuttle conveyor and a transport conveyor according to the present invention.
Figure 2:
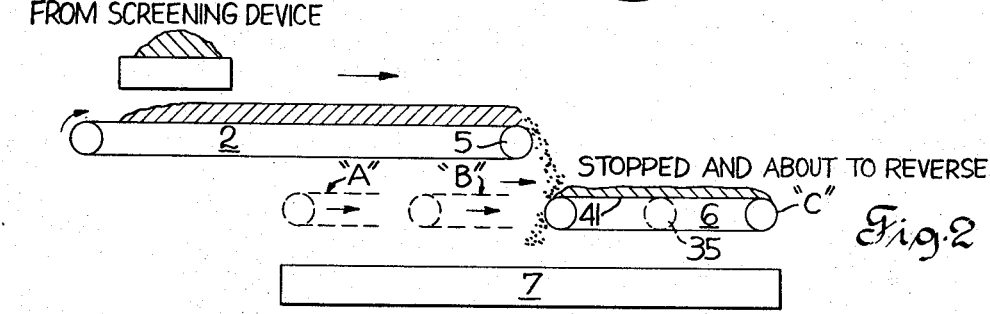
FIGS. 2 through 5 are views taken in elevation along line II—II in FIG. 1 as viewed in the direction indicated by arrows and illustrating certain sequential positions occupied by the shuttle conveyor in the operation of the disclosed system.

With the operation of the apparatus shown in FIG. 7 and FIG. 8 having been described, reference will now be made to the sequence of operation diagrammatically illustrated in FIGS. 2–6. With the apparatus as shown in FIG. 2 operation may begin with shuttle conveyor 6 in the position indicated by broken lines and the identification character A, and with material on the delivery conveyor 2 as shown but no material as yet deposited on shuttle conveyor 6. As shuttle conveyor 6 moves to the right the upper strand 41 also moves to the right. As shuttle conveyor 6 moves from position A to position B material falling over roll 5 of delivery conveyor 2 will hit conveyor 6 but will immediately be dumped over roll 35 to transport conveyor 7. However, as conveyor 6 moves from position B to position C, material caught on upper strand 41 will be carried to but not over roll 35 and when conveyor 6 reaches position C in FIG. 2 the upper strand will, as shown, carry a layer of material. At this point, and as labeled in FIG. 2, the conveyor 6 is "stopped and about to reverse," which is an action, the results of which is shown in FIG. 3.

Figure 3:
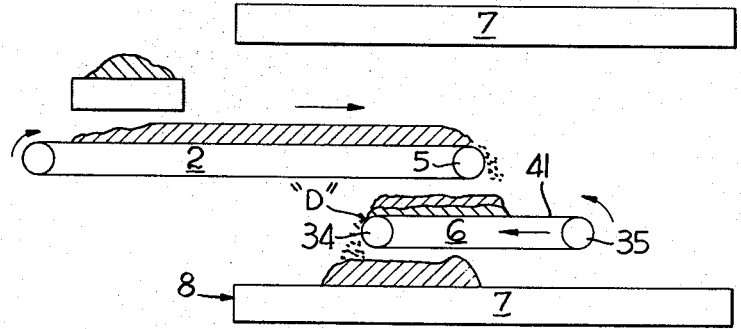
Figure 4:
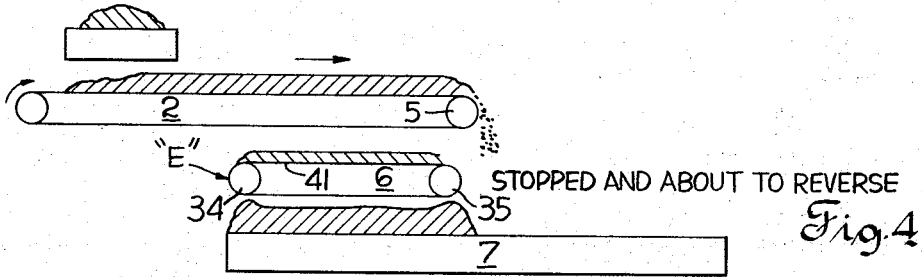
Figure 5:
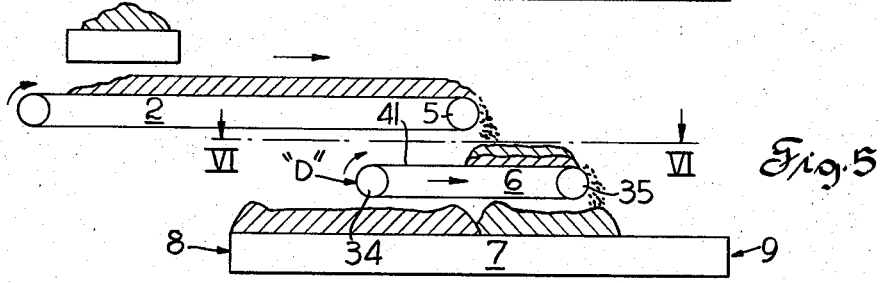
Figure 6:
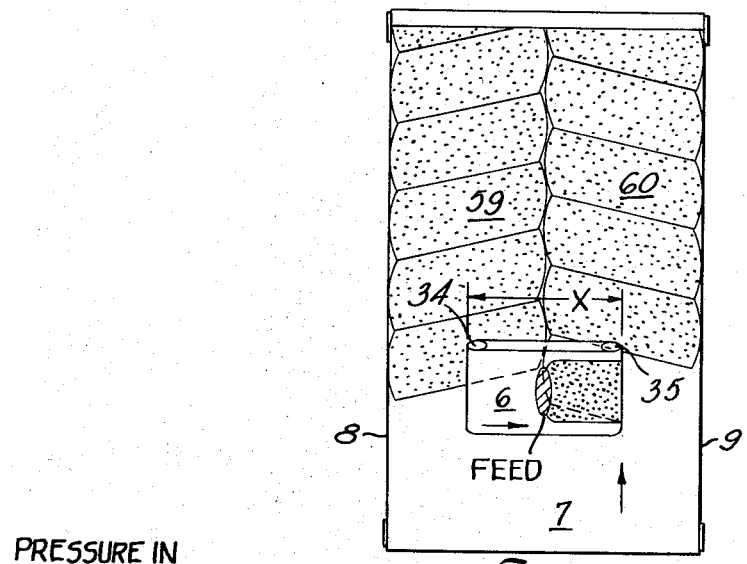
FIG. 6 is a plan view taken along line VI—VI in FIG. 5, showing the pattern of material spread on the transport conveyor by the shuttle conveyor.

As shown in FIG. 3, conveyor 6 is in a position D. The move from position C to D caused a second layer of material to be laid upon upper strand 41 while both layers are dumped over roll 34 to distribute material on conveyor 7 from the center area to edge 8. From position D shown in FIG. 3 to position E shown in FIG. 4 only a single layer of material will be laid upon and retained on top of strand 41. As conveyor 6 reverses and returns to position D as shown in FIG. 5 a second layer of material will be laid upon upper strand 41 while both layers are dumped over roll 35 to distribute a layer of material on the second half of conveyor 7 from the center area to edge 9. The movement of conveyor 6 as shown in FIG. 5 completes the distribution and spreading of material across the entire width of conveyor 7 from edge 8 to edge 9 in a pattern shown from above in FIG. 6. As shown in FIG. 6 material is spread upon conveyor 7 by the shuttle conveyor 6 in a series of chevron strips defined by straight but angled strips 59, 60. Thus a stream of material labeled "Feed" in FIG. 6 of relatively small dimension, is spread over the entire width of a conveyor 7 much wider than the "Feed" stream and by utilizing only a shuttle conveyor 6 having an effective length (defined as the distance X shown in FIG. 6, i.e., the distance between the outer extremities of rolls 34, 35) of only about one-half of the width of conveyor 7 between edges 8 and 9. The effective length X of shuttle conveyor 6 can be adjusted by moving brackets 32, 33 relative to slots 36 and thereby move rolls 34, 35 closer together or farther apart. Thus the distance X can be changed and position of slack take-up roll 46 can be adjusted in brackets 47 to establish and maintain desired tension on the shuttle conveyor belt 40. It can therefore also be said of the shuttle conveyor 6 that has been described, that it provides for spreading material across a span of up to twice the maximum of the adjustable effective length of the shuttle conveyor. Furthermore, since the servomotor 51 utilized to reciprocate the shuttle conveyor frame 22 back and forth over the wider conveyor 7, also pushes and pulls the roll 34 to which pinion gear 57 is attached and thereby pinion gear 57 is rolled on rack 58 with which it continuously engages, the motion of upper strand 41 of conveyor belt 40 is positively locked in with motion of frame 22 and strand 41 must always move in the same direction as frame 22 and strand 41 must reverse precisely at the same time frame 22 reverses. The operation in sequence that has been described, is thus positively insured and the motion of the conveyor belt 40 cannot get out of the predetermined sequential relationship with the reciprocating movement of piston 53 and frame 22.

From the foregoing detailed description of the present invention, it has been shown how the objects of the invention have been attained in a preferred manner. However, modifications and equivalents of the disclosed concepts such as readily occur to those skilled in the art are intended to be included within the scope of this invention.

The embodiments of the invention in which exclusive property or privilege is claimed are defined as follows:

1. An apparatus for conveying and distributing loose flowable material comprising:
    (A) a transport conveyor for receiving and transporting material distributed thereon and having longitudinally extending parallel spaced first and second edges;
    (B) a delivery means spaced above the transport conveyor and arranged to drop material over a central portion of the transport conveyor between the first and second edges thereof;
    (C) a shuttle conveyor spaced above the transport conveyor and below the delivery means to intercept material dropping from the delivery means toward the transport conveyor;
    (D) the shuttle conveyor comprising an endless loop of belt lapped about a first and a second roll spaced apart and parallel to each other and with upper and lower strands of belt between the rolls being transverse to the transport conveyor and of a length spanning approximately one-half the width of the transport conveyor between the first and second edges thereof;
    (E) reversible shuttle conveyor drvie means for reciprocating the shuttle conveyor with a first stroke moving the shuttle conveyor to position the first roll over the first edge of the transport conveyor, and a second and reverse stroke moving the shuttle conveyor to position the second roll over the second edge of the transport conveyor; and
    (F) reversible belt drive means for turning the rolls and moving the belt of the shuttle conveyor and operative to move the upper strand in the same direction and along with each of the strokes moving the shuttle conveyor, to thereby discharge material intercepted by the shuttle conveyor over the first roll while moving toward the edge of the transport conveyor and over the second roll while moving toward the second edge of the transport conveyor to distribute material from the delivery means across the entire width of the transport conveyor.

2. An apparatus according to claim 1 in which the delivery means comprises a conveyor having an endless belt looped about rolls horizontally spaced apart, with a discharge end thereof being established by one of the rolls, and with the discharge end roll being located over the central portion of the transport conveyor and parallel to the first and second edges.

3. An apparatus according to claim 1 including a track assembly supported in fixed position above and transverse to the transport conveyor, and with the shuttle conveyor mounted on the track assembly for reciprocating movement thereon and across the width of the transport conveyor.

4. An apparatus according to claim 3 in which the reversible shuttle conveyor drive means comprises a fluid pressure operated servomotor having a cylinder connected to the track assembly and a piston connected to the shuttle conveyor, and fluid pressure control means operable to alternately admit and exhaust fluid pressure to and from both ends of the cylinder to move the piston and the shuttle conveyor connected thereto with a reciprocating motion.

5. An apparatus according to claim 3 in which the reversible drive means for the belt of the shuttle conveyor comprises a pinion gear concentrically attached to one end of one shuttle conveyor turning roll, a rack gear supported in fixed position by the track assembly above the transport conveyor and parallel to the motion of the shuttle conveyor thereon, and with the pinion gear engaging the rack gear whereby the alternating first and second strokes of the shuttle conveyor rotate the pinion gear along the rack gear and rotate the shuttle conveyor turning rolls to turn the top portions thereof in the direction of the strokes.

6. An apparatus according to claim 1 in which the rolls of the shuttle conveyor are adjustable relatively toward and away from each other in a horizontal plane, and including an adjustably positioned slack take-up roll engaging the lower strand of the shuttle conveyor belt, whereby adjusting movement of the rolls towrad and away from each other adjusts the effective operating length of the upper strand of the shuttle conveyor belt and the adjustable position slack take-up roll provides for establishing and maintaining selected tension on the shuttle conveyor belt.

7. An apparatus according to claim 6 in which the shuttle conveyor includes a frame with the rolls of the shuttle conveyor being adjustably connected thereto for moving the rolls relatively toward and away from each other in a horizontal plane, and the slack take-up roll is also adjustably supported by the shuttle conveyor frame for adjusting the position of the slack take-up roll relative to the shuttle conveyor frame and rolls, to establish and maintain selected tension on the shuttle conveyor belt.

8. A shuttle conveyor for spreading a stream of material across a span having a dimension up to twice the length of the shuttle conveyor, comprising:
    (A) a frame with a first and a second roll journaled therein and rotatable each about its central axis, with the rolls being parallelly spaced apart and lapped by an endless loop of conveyor belt to provide an upper and lower strand;
    (B) first reversible drive means connected to the frame and operable to move the frame with a reciprocating first and second stroke in opposite directions along a horizontal path normal to the central axis of each roll and for a distance up to the distance spanned by the rolls; and
    (C) a second reversible drive means connected to at least one of the rolls for turning the roll to move the upper strand relative to the frame in the same direction the first reversible drive means moves the frame to discharge material from the upper strand over the roll which is the lead roll for each of the oppositely directed strokes of the frame, and thereby spread material across a span of up to twice the length of the upper strand of the belt.

9. An apparatus according to claim 8 in which the second reversible drive means for the belt of the shuttle conveyor comprises a pinion gear concentrically attached to one end of one shuttle conveyor turning roll, a rack gear supported in fixed stationary position relative to the frame and parallel to the path of motion of the frame, and with the pinion gear engaging the rack gear whereby the alternating first and second strokes of the frame rotates the pinion gear along the stationary rack gear and rotatts each roll to turn the top portions thereof and move the upper strand of the belt in the direction of the strokes.

10. An apparatus according to claim 8 in which the rolls journaled in the frame are adjustable relatively toward and away from each other in a horizontal plane, and including an adjustably positioned slack take-up roll engaging the lower strand of the shuttle conveyor belt, whereby adjusting movement of the rolls toward and away from each other adjusts the effective operating length of the upper strand of the shuttle conveyor belt and the adjustable position slack take-up roll provides for establishing and maintaining selected tension on the shuttle conveyor belt.

References Cited

UNITED STATES PATENTS

| | | | |
|---|---|---|---|
| 3,184,037 | 5/1965 | Greaves | 198—89 |
| 3,307,679 | 3/1967 | Zieoler et al. | 198—112 |

ROBERT G. SHERIDAN, Primary Examiner

U.S. Cl. X.R.

198—101, 110